United States Patent [19]

Brown

[11] 4,384,175

[45] May 17, 1983

[54] TONE DETECTION METHOD AND ARRANGEMENT FOR OBSERVING AND CLASSIFYING REPETITIVE STATUS SIGNALS

[75] Inventor: David B. Brown, Columbus, Ohio

[73] Assignee: Bell Telephone Laboratories, Incorporated, Murray Hill, N.J.

[21] Appl. No.: 299,888

[22] Filed: Sep. 8, 1981

[51] Int. Cl.³ .............................................. H04M 3/24
[52] U.S. Cl. .......................... 179/175.2 C; 179/1 MN; 179/7.1 R
[58] Field of Search .................. 179/175.2 C, 175.2 B, 179/175.2 D, 18 AH, 18 E, 18 ES, 18 EB, 27 G, 1 MN, 84 VF, 8 A, 7 R, 7.1 R, 8 R, 84 SS, 18 HB, 84 R, 84 A

[56] References Cited

U.S. PATENT DOCUMENTS 3,920,913 11/1975 Keeney ................................ 179/8 A
4,066,843 1/1978 Waks et al. .......................... 179/8 A

*Primary Examiner*—Stafford D. Schreyer
*Attorney, Agent, or Firm*—C. H. Davis

[57] ABSTRACT

A service-observing arrangement is disclosed for automatically detecting and classifying interrupted tone signals (such as audible ringing, busy, reorder, etc.) which appear on telephone lines. These signals have a certain "pitch rate" discernible by the listener and caused by the combining of a plurality of separate tone signals.

The line is scanned and the signals on the line are first passed through a filter to filter out all frequencies within the "pitch rate" spectrum and are not fundamental components of the interrupted signal. The remaining signal is then modulated to produce a significant energy component at the "pitch rate" only if legitimate signals are present. The ratio of pitch rate energy to total energy is then compared to threshold values and its cadence and power consistency are checked to identify the signal.

12 Claims, 17 Drawing Figures

AUDIBLE RINGING TONE
---- SILENT INTERVAL

RINGING BUFFER QUEUE

"MAIN" CONTROL PROGRAM SEQUENCE

RING EVAL SUBROUTINE

TONE DETECTION METHOD AND ARRANGEMENT FOR OBSERVING AND CLASSIFYING REPETITIVE STATUS SIGNALS

TECHNICAL FIELD

This invention relates to monitoring arrangements and particularly to arrangements for monitoring communication lines for the presence of certain signals. More particularly, this invention relates to service-observing arrangements for telecommunication networks wherein the status of a communication line can be ascertained from the presence of various signals detected on the line. In a still more particular aspect, this invention relates to a method and apparatus for identifying particular signals on communication lines to ascertain the disposition of cells in a telephone network.

BACKGROUND OF THE INVENTION

Most telephone calls are completed without the aid of an attendant, and the calling customer is informed of the disposition of the call by tone signals or voice announcements transmitted over the connection. In order to provide good service, it is desirable for the telephone company to be apprised of any difficulties that may be encountered in the completion of calls automatically and without an attendant's assistance.

In the past, calls were monitored by bridging a service-observing attendant to the connection to observe the progress and disposition of the call. Thus, the observer could record the number dialed by the calling party and then monitor the transmission path for audible ringing, busy, recorder, and supervisory signals which indicated the disposition of the call. The observer would then make a record of the call and discontinue monitoring before any conversation began.

In the interest of maintaining privacy in the telephone system and automating the service-observing function, arrangements were devised for monitoring a telephone connection and automatically ascertaining the nature of the tones returned to the calling customer.

Typical signals present on telephone lines which indicate the disposition of the call are audible ringing, busy and reorder. The audible ringing signal is heard at the calling station when the called station is being rung to inform the calling customer that the connection has been completed. This tone continues until the called customer answers or the call is abandoned. Busy and reorder signals, on the other hand, are heard when the called line is busy or when no circuits or equipment are available, such as during traffic overloads or equipment failures.

Generally, the signals comprise voice frequency tones that are combined linearly or by modulation wherein the combined tones are then interrupted at a preassigned rate or cadence. For example, the audible ringing signal may comprise a series of two-second tone bursts wherein adjacent bursts are separated by a four-second silent interval. The busy and reorder signals generally comprise a combination of tones interrupted at 60 and 120 times per second, respectively.

Many of the automatic prior art service-observing arrangements ascertain the nature of these signals primarily through the recognition of their cadence. While these arrangements are suitable for their intended purpose, they require that the signal be present for a sufficient length of time so that a repetitive pattern can be recognized. Also, since these frequencies fall within the voice frequency range, they are highly susceptible to interference from the calling party who may inadvertently introduce signals which frustrate the recognition of the cadence.

Certain prior art service-observing arrangements rely on bandwidth filters which respond only to those frequencies normally used for audible ringing, busy and reorder signals. While these arrangements are wholly suitable for their intended purpose, it must be recognized that precise filtering arrangements cannot be used with any degree of reliability. The reason for this is that audible ringing, busy and reorder signals are generated by sources at many different switching offices, and the frequencies may vary from one office to the next. Furthermore, the methods in which the signals are generated differ throughout the switching network. For example, to generate an audible ringing signal, one office may linearly combine 440 Hz and 480 Hz tones while another office may modulate a 420 Hz tone with a 40 Hz tone. Likewise, busy and reorder signals may be generated by two methods, namely, the linear combination of 620 Hz and 480 Hz tones or by a method wherein a 600 Hz tone is modulated by a 120 Hz or 133 Hz signal. At any given switching office, however, the busy and reorder signals are usually generated by the same method and differ only in cadence.

While the modulation of linear combination methods of generating signals have different frequency components, the signals nevertheless, provide the listener with comparable sounds having similar "buzz" or "pitch" rates. For example, in the case of modulated audible ringing signals, the 40 Hz envelope or pitch rate of the signal may be heard by the customer, while with the linearly combined signals the station transducers and human ear perceive a similar pitch rate sensation between 30 Hz and 50 Hz for the listener even though no energy is present on the line at the 30 Hz to 50 Hz rate.

Similarly, busy and reorder signals have a characteristic pitch rate within the 90 Hz to 150 Hz range that is discernible to the calling customer whether the signal was generated by the linear combination method or the modulation method outlined above.

Thus, measuring the energy level precisely at one frequency, say 420 Hz for an audible ringing signal, may be suitable for detecting the modulated version of an audible ringing signal, but this would be wholly unreliable for detecting an audible ringing signal which comprises the linear combination of 440 and 480 Hz.

SUMMARY OF THE INVENTION

The foregoing problem is solved and a technical advance is achieved by an arrangement for automatically detecting and classifying signals on telephone lines such as audible ringing, busy and reorder by their pitch rate and cadence. More specifically, all signals on the telephone line within a designated bandwidth (i.e. the pitch rate) are removed by filtering. This eliminates the possibility that extraneous noise and voice signals at the pitch rate will be mistaken for a legitimate signal. The signal remaining after filtering is then modulated to produce energy at the sum and difference terms of the frequencies that are still present. The energy in the modulated signal is then measured at the pitch rate bandwidth. Any energy detected in this bandwidth after modulation is normalized by comparing its energy level with the total energy level of the signal on the line. The cadence of the normalized signal is thereafter ascertained to identify the signal.

Thus, if audible ringing is present on the line, substantial energy will be detected at the 40 Hz pitch rate in the modulated signal whether the original signal was made up of 420 Hz modulated by a 40 Hz signal or the linear combination of 440 Hz and 480 Hz.

DETAILED DESCRIPTION

Figure 1:
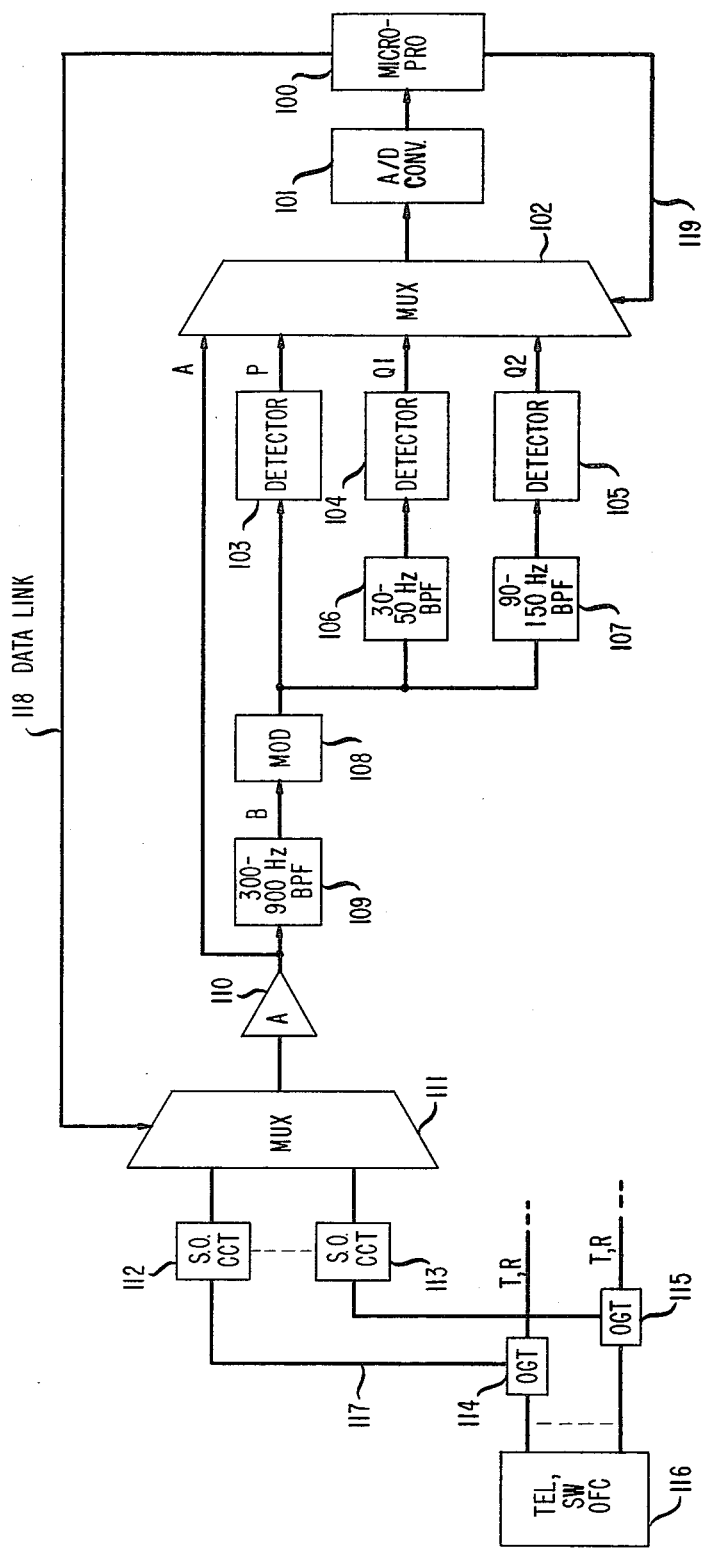
FIG. 1 shows a block diagram of a typical service-observing arrangement embodying the invention.

FIG. 1 shows a block diagram of a service-observing arrangement incorporating the invention. The service-observing arrangement comprises a microprocessor 100, analog-to-digital converter 101, multiplexers 102 and 111, envelope detectors 103-105, and bandpass filters 106, 107 and 109 in addition to service-observing circuits 112 and 113 modulator 108 and amplifier 110.

The service-observing circuits 112 and 113 provide an interface between the service-observing arrangement and the telephone switching network. In FIG. 1, service-observing circuits 112 and 113 are shown connected to outgoing trunks 114 and 115, respectively, and these trunks, in turn, are connected to telephone switching office 116. More specifically, trunk circuit 114 is connected to service-observing circuit 112 over conductors 117 for monitoring the condition of trunk circuit 114. As is well known in the art, service-observing arrangements permit the monitoring of the transmission conductors and supervisory states of a trunk circuit so that the progress of calls and their disposition can be observed and recorded. While the observing circuit is shown connected only to outgoing trunks, it will be obvious to those skilled in the art that these service-observing circuits can be connected to line circuits, attendant positions, etc.

Service-observing circuits 112 and 113 are periodically scanned by multiplexer 111 which is under the control of processor 100 via data link 118. Thus, trunks, lines, etc. can be selectively monitored at different intervals and at varying rates depending upon the requirements of the system. While service-observing arrangements are generally equipped to record the number dialed by the calling party and the on-hook or off-hook supervisory states of the trunk, etc., the invention disclosed herein is concerned mainly with the recognition and classification of various customer tone signals such as audible ringing, busy and reorder as described above.

Before continuing with the detailed description, it will be helpful to the reader to understand the nature of the signals under consideration. These signals fall within the voice frequency range and are heard by the calling customer indicating the status of the call. Of course, the invention is not limited to detecting those signals mentioned above, but contemplates other special purpose signals which may be used, for instance, for directing the calling customer to take certain action in placing a call, coin disposal signals, etc.

The most robust feature identifying busy, reorder and audible ringing (sometimes referred to as ringback tone) is the cadence of the signal. Busy and reorder signals are generally comprised of two frequencies interrupted at 60 and 120 interruptions per minute, respectively. Depending on the type of signal generator used, the signal may be made up at a 600 Hz tone modulated by a 120 Hz or 133 Hz tone. Other signal generators linearly combine a 480 Hz tone with a 620 Hz tone for both busy and reorder signals. The busy and reorder signals generated by a given switching office are usually derived from the same tone generators and differ only in their cadence.

Audible ringing also has a distinct cadence which in some systems comprises successive two-second audible ringing bursts separated by four-second silent intervals. The signal for audible ringing may comprise a 420 Hz tone modulated by a 40 Hz tone, or a linear combination of two tones, namely 440 Hz and 480 Hz. Insofar as the recognition of audible ringing is concerned, it will be appreciated that a sample must be taken over a long interval to establish the cadence, particularly if complex coded ringing signals are used in party line systems and the like.

Through the study of signals from many sources in a large switching network, it has been observed that these signals, while differing in frequency components, generally have recognizable pitch rates. More specifically, in the case of an audible ringing signal, it is found to have a pitch rate in the vicinity of 40 Hz, whether the signal was generated by modulating a 420 Hz tone with a 40 Hz signal, or by linearly combining the 440 and 480 Hz tones.

When a 420 Hz tone is modulated by a 40 Hz tone, electrical energy is present and detectable on the telephone line at the 40 Hz pitch rate. While no energy is present at this pitch rate due to the linear combination of 440 and 480 Hz tones, through the telephone receiver and human ear the listener perceives a signal at approximately the 40 Hz pitch rate. Thus, regardless of the source and minor differences in frequency, the audible and ringing generators being considered herein provide the listener with a common signal having a discernible pitch rate in the vicinity of 40 Hz.

Similar phenomena exists with respect to busy and reorder signals whether they are derived by modulation or linear combination. These signals generally have a pitch rate perceptible in the 90 Hz to 150 Hz range.

In accordance with a feature of the invention, signals falling within the pitch rate are first filtered from the monitored signal which is then modulated to produce energy at the pitch rate if audible ringing, busy or reorder signals are present. With reference to FIG. 1, the incoming signal is amplified by amplifier 110 and passes through bandpass filter 109 which eliminates frequencies below 300 and above 900 Hz. Filter 109 provides a window just wide enough to pass the major spectral components of the customer signal. All other frequencies (including those at the pitch rate) having energy components outside of this range are blocked. Blocking these signals helps to prevent voice and extraneous noise at the pitch rate from being mistaken for a legitimate audible ringing, busy or reorder signal. The remaining signal from filter 109 is then processed by modulator 108.

Modulator 108 in the illustrative embodiment is a nonlinear circuit and can be a precision rectifier or a squaring circuit as is well known in the art. By squaring the signal from filter 109, energy is produced at the sum and difference terms of the freqencies present between 300 Hz and 900 Hz. If a legitimate busy, reorder or audible ringing signal is present, the difference terms will produce energy at the busy/reorder or ringback pitch rate, and this energy is applied to filters 106 and 107 and to envelope detector 103.

Detector 103 provides an analog output measurement of the total energy present in the 300 Hz to 900 Hz bandwidth as modulated by modulator 108. The measurement is in the form of a voltage proportional to the magnitude of energy in this bandwidth and will be used as a reference level when the energy levels of the signals representing the busy/reorder and audible ringing are normalized.

The output of modulator 108 is filtered by filters 106 and 107 which are the 30 Hz to 50 Hz and 90 Hz to 150 Hz bandpass filters, respectively. These filters are centered around the signal pitch rates for the audible ringing signal and the busy/reorder signals, respectively. The envelope detectors 104 and 105 provide an analog voltage output comparable to the energy produced at these pitch rates. Thus if an audible ringing signal is present the output of detector 104 will be high while busy or reorder signals will cause a high output from detector 105. The outputs of all three detectors 103-105 are sampled at a 500 Hz sampling rate by multiplexer 102 under the control of processor 100. Each sample is converted into a digital code by analog-to-digital converter 101 for transmittal to processor 100. Processor 100 analyzes the information from converter 101 to ascertain and classify the signal on the telephone circuit being monitored.

More specifically, processor 100 periodically sums a plurality of sample outputs from detectors 104 and 105. The sum of these samples is then divided by the sum of a plurality of sample outputs over the same time interval from detector 103. The latter samples represent the total energy on the line. The dividing process results in a term referred to herein as a normalized sample for audible ringing tone and a similar normalized sample for busy/reorder tone.

When sufficient normalized samples have been observed, they are examined to ascertain if they meet the repetitive pattern of known busy, reorder or audible ringing signals. This is done by comparing each normalized sample to preassigned threshold values and examining the number of normalized samples that meet this criteria and those that do not to ascertain if the normalized samples fit into predetermined cadence patterns.

DETAILED DESCRIPTION OF PROCESSOR OPERATION

A description will now be given of the operation of processor 100 in connection with FIGS. 2 and 3 and the flow diagrams shown in FIGS. 4-17. The flow diagrams depict the sequence of operation of the processor in analyzing the signals, and the operations can be divided into a control program sequence and three subroutines. The control program sequence called MAIN is shown in FIGS. 4-7 and comprises a sequence of operations for gathering the sample data, normalizing the data, calling the other subroutines to analyze the data, and outputting the results of the determination.

The three subroutines called by MAIN are identified as TONE SEARCH, BUSY EVAL and RING EVAL. The TONE SEARCH sub-routine analyzes the gathered samples to ascertain if the samples represent a possible audible ringing, busy or reorder tone, and the RING EVAL and BUSY EVAL subroutines analyze the results of the TONE SEARCH sequence to ascertain the cadence of the detected signal.

Figure 2:
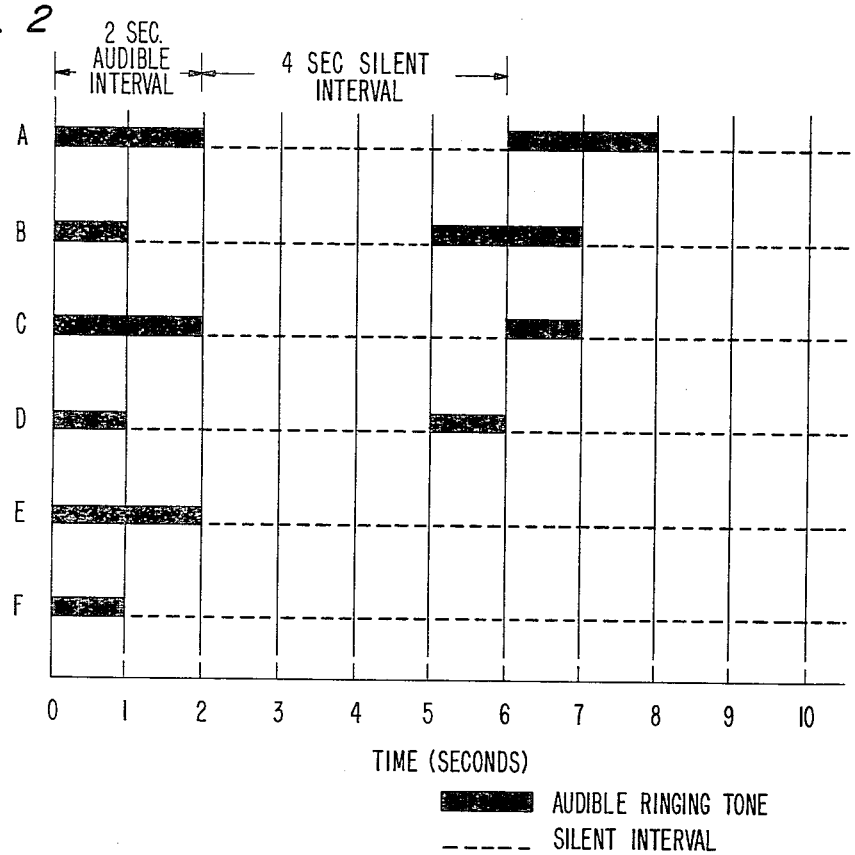
FIG. 2 is a graphical representation of the different examples of interrupted tones that can be detected by the service-observing arrangement.

Before considering the sequence of operation of processor 100, the reader's attention is directed to FIG. 2 which depicts six different conditions under which a ringing tone might be detected on the line.

The ringing tone being described in this example comprises successive two-second audible ringing bursts separated by four-second silent intervals to make up a six-second repetitive signal. Depending on when the tone is first detected and when the ringing is tripped by the called customer or when the call is abandoned by the calling customer, it might be impossible to detect the full six-second cycle on a repetitive basis.

For example, case A in FIG. 2 shows an example wherein more than one complete ringing cycle has been detected, namely, two full two-second ringing bursts separated by a four-second silent interval. Case B, on the other hand, shows a situation where the connection was established during the middle of the first ringing interval and remains connected for at least one additional ringing interval, while case C shows a situation where one complete ringing burst was detected, but ringing is terminated during the second ringing burst either because the call was answered or abandoned.

Case D depicts an audible ringing tone pattern wherein the signal was detected in the middle of the first ringing burst and terminated during the second ringing burst, and cases E and F depict situations where the call was terminated at the end of or during the first ringing burst that was detected.

Although FIG. 2 relates to audible ringing signal situations, it will be obvious to those skilled in the art that similar patterns can be illustrated for busy and reorder signals except that the duration of the tone burst and the silent interval between the bursts would differ. Also, the identification of busy and reorder signals in cases E and F would be less reliable since these signals generally use the same tones, and with only one tone sample the differences in cadence between busy and reorder cannot be measured reliably.

"MAIN" CONTROL PROGRAM SEQUENCE

Figure 4:
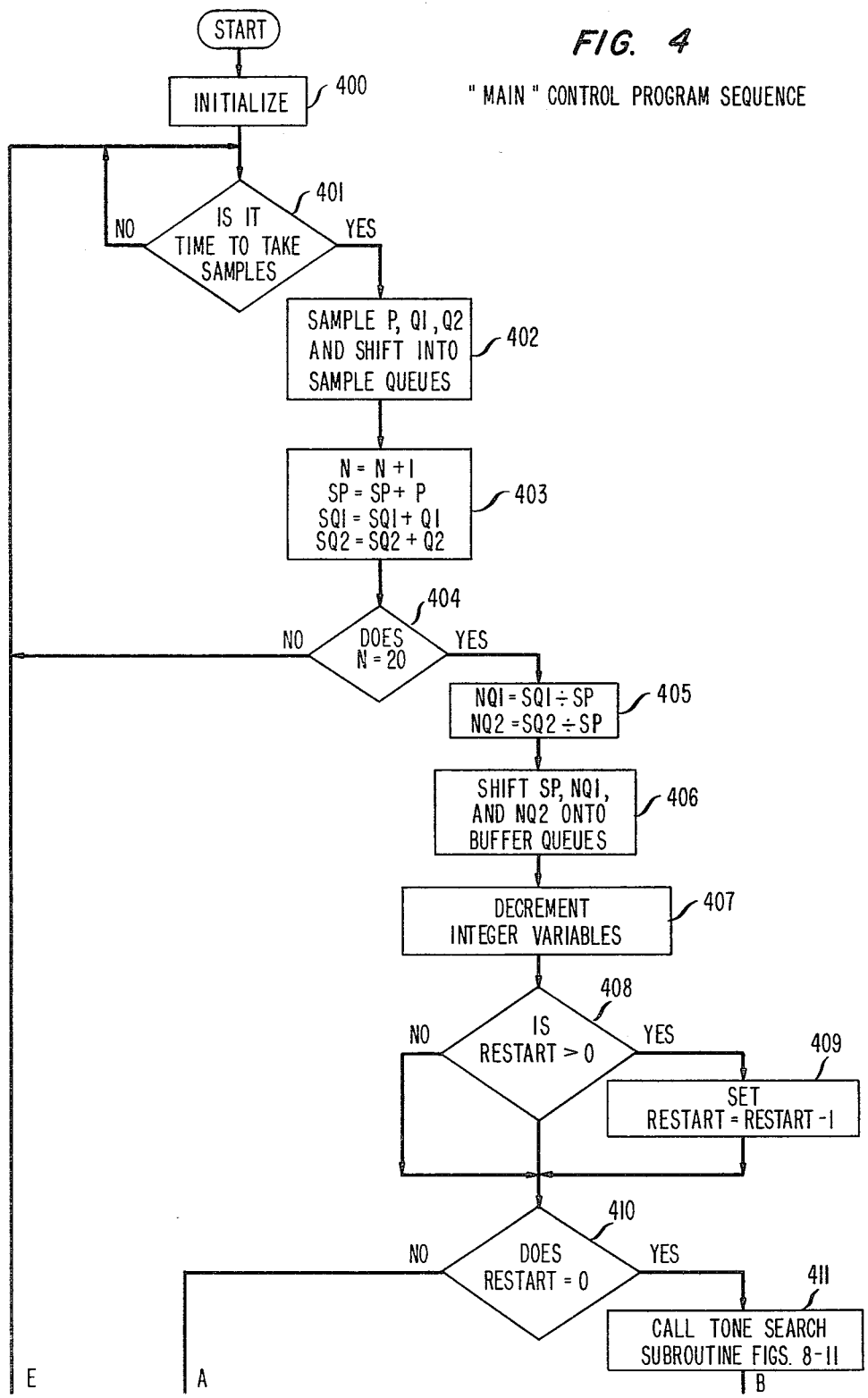
FIGS. 4-6, when arranged according to FIG. 7, is a flow diagram of the MAIN control program which describes the overall sequence of operation of the processor used in the service-observing arrangement.
Figure 5:
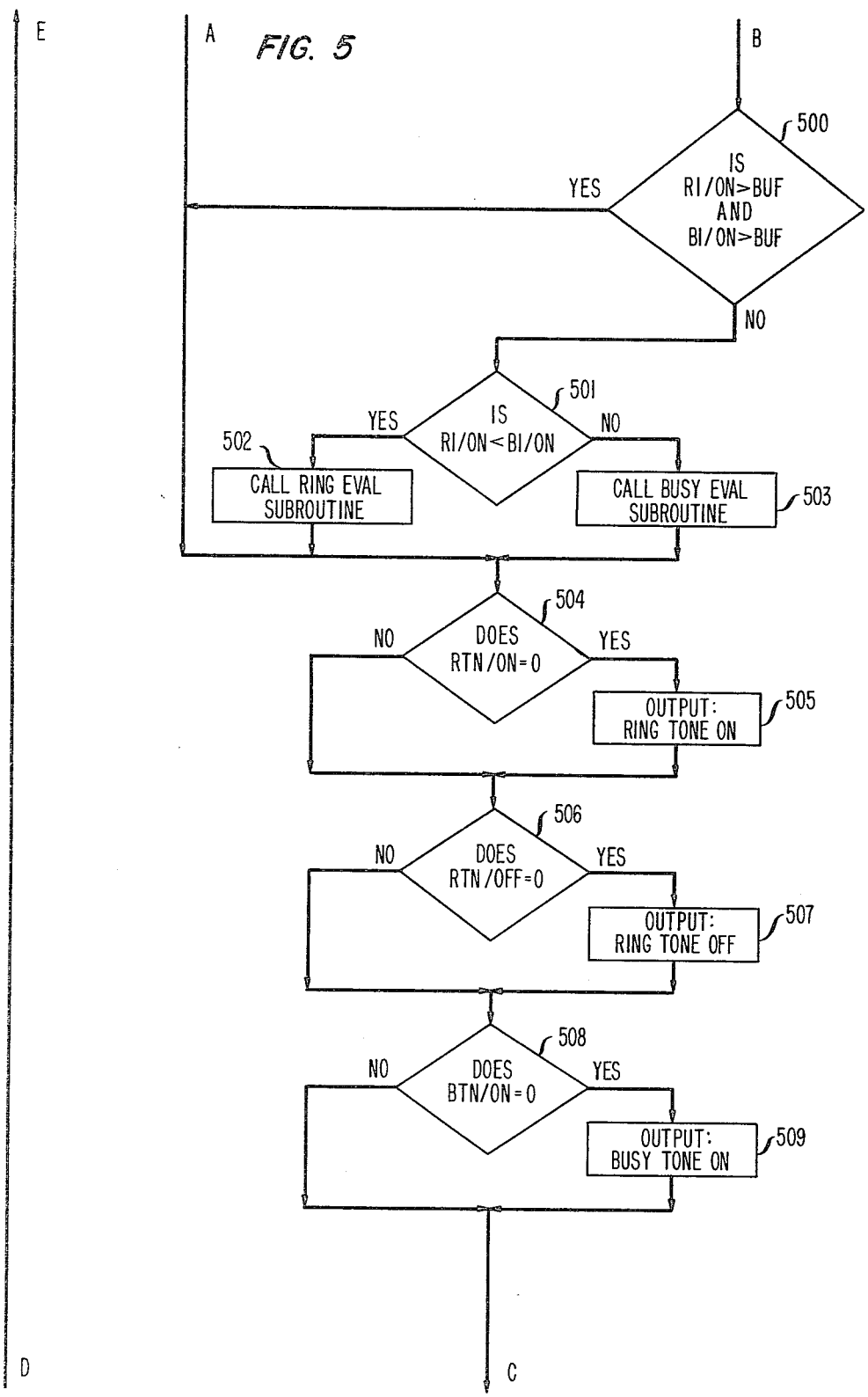
Figure 6:
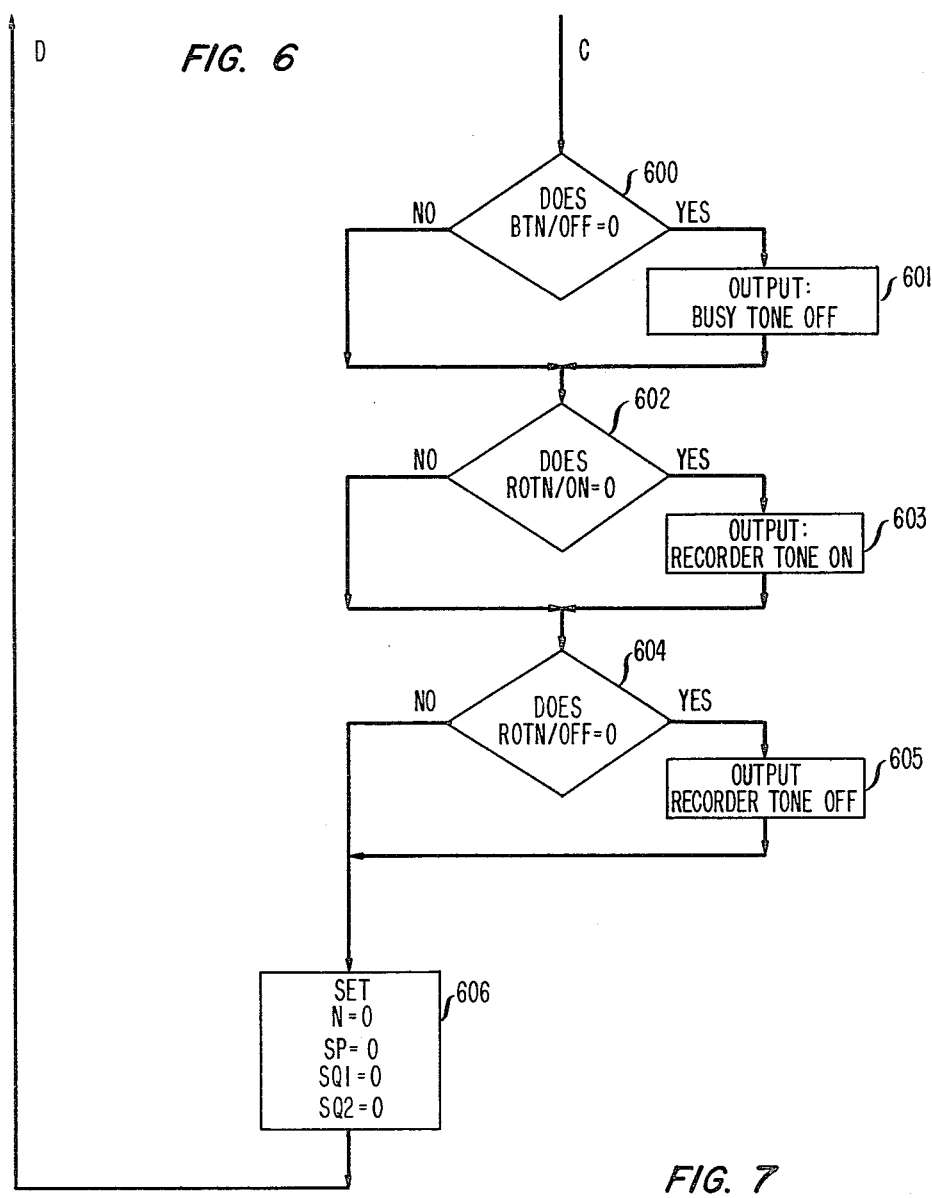
Figure 7:
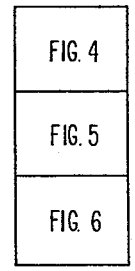
Figure 8:
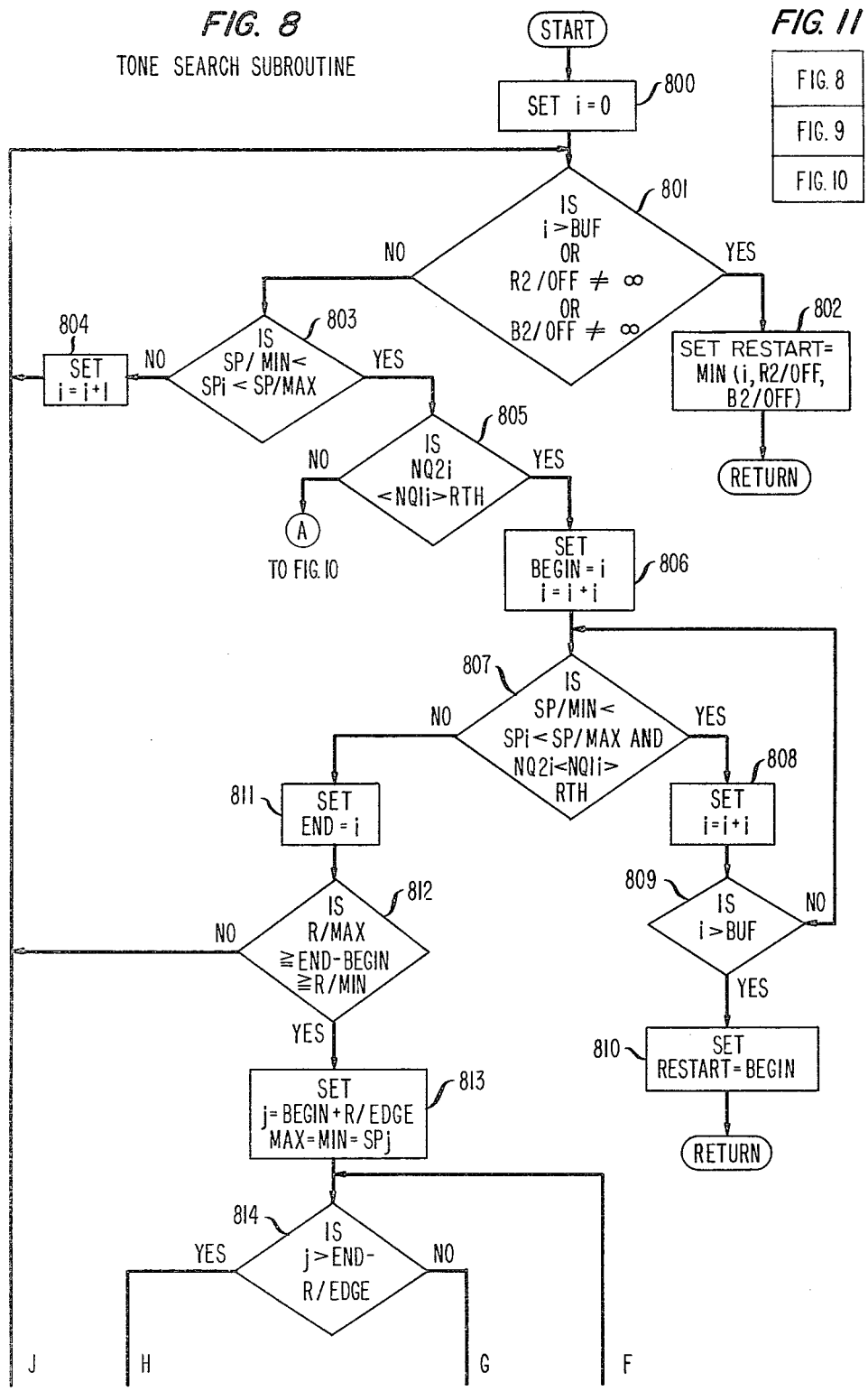
FIGS. 8-10, when arranged according to FIG. 11, is a flow diagram of the subroutine TONE SEARCH which describes the service-observing arrangement processor operation in analyzing tones on a telephone line.
Figure 9:
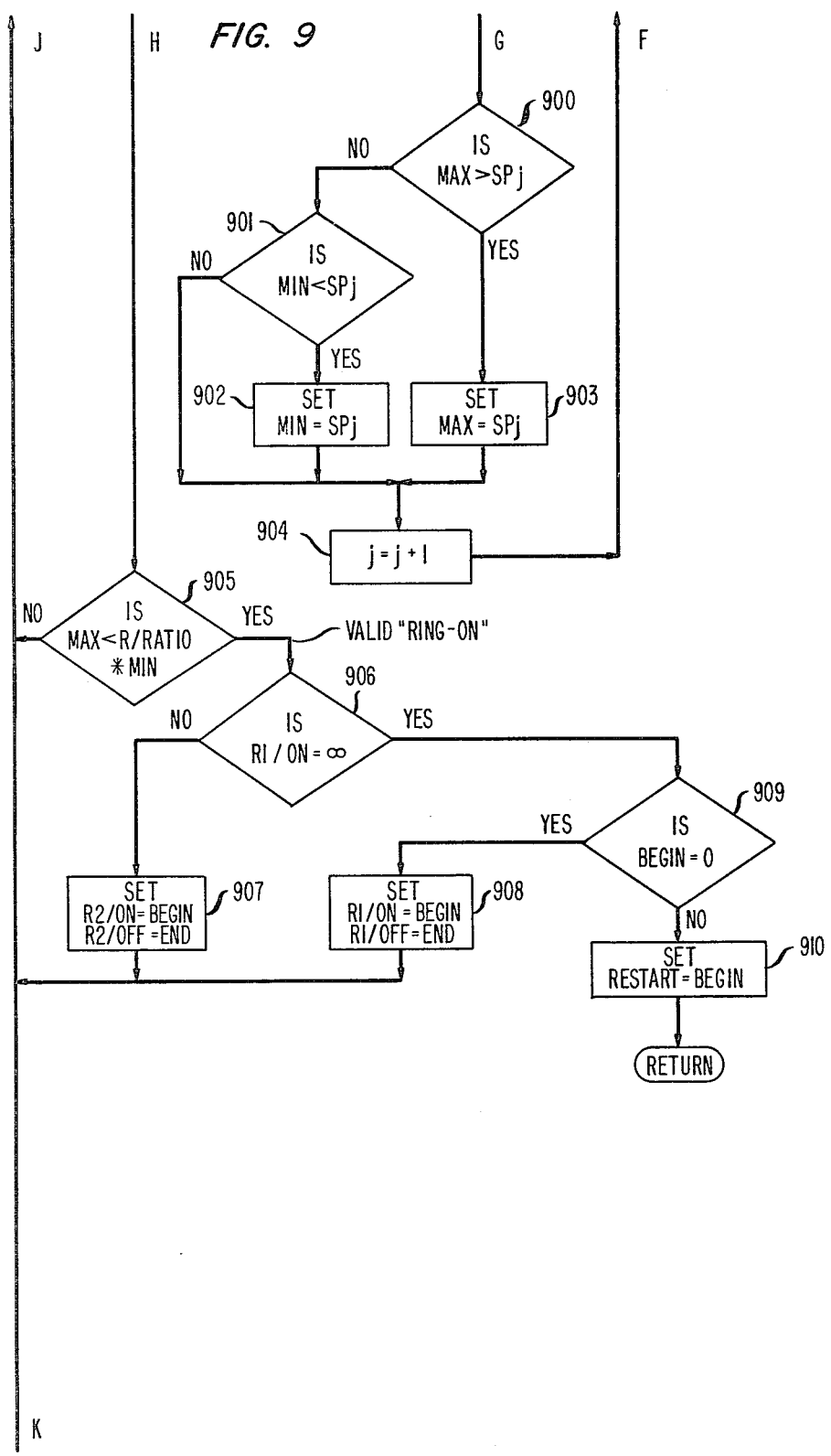

Turning now to FIGS. 4-6, when arranged according to FIG. 7, a description will now be given of the control program sequence designated herein as MAIN. The MAIN sequence of events generally controls the sampling of detectors 103 to 105 (FIG. 1) and loads the samples into sample queues. When enough data has been collected, the TONE SEARCH subroutine will be called to ascertain if the detected tone is a valid audible ringing, busy or reorder tone, as distinguished from other tone bursts, speech or noise on the line. If a valid tone burst is indicated, either subroutine BUSY EVAL or RING EVAL will be called to check the cadence of the tone. Since in the examples described herein both busy and reorder tones contain the same frequency components the BUSY EVAL routine will distinguish between busy and reorder by their cadence. Return to the MAIN routine from one of the RING EVAL or BUSY EVAL sequences will cause the ascertained result to be outputted.

The MAIN program is first initialized to set certain pointers equal to infinity, to set other pointers delimiting samples to indicate which samples have been processed by the program, and to establish certain queues to be used by the program. For example, to indicate the beginning and end of the first and second audible ringing tone intervals R1/ON and R1/OFF, R2/ON and R2/OFF are established. Similar pointers designated B1/ON, B1/OFF, B2/ON and B2/OFF are established for busy or reorder tones. A pointer designated RESTART is also set to equal the maximum buffer size to indicate that no samples have been processed at this time.

After the MAIN program is initialized, decision box 401 is executed to ascertain if it is time to take a sample of detectors 103-105. In the illustrative example, samples are taken at a 500 Hz sampling rate. However, it is obvious that other sampling rates can be used within the spirit and scope of the invention.

The individual samples designated P, Q1, and Q2 are loaded into sample queues designated POWER-SAMPLE, RINGING-SAMPLE and BUSY-SAMPLE, respectively, These sample queues typically comprise software shift registers capable of storing the digital outputs of analog-to-digital converter 101 (FIG. 1) which converts the voltage level outputs of detectors 103-105 into digital words representing the detected level. The sample queues are of different lengths and are used to compensate for signal delays experienced in the particular implementation of bandpass filters 106-107. Although the samples from detector 105 are loaded into the BUSY-SAMPLE queue, it should be noted that these samples represent busy and reorder signals which differ in this embodiment only by their cadence.

Each time the three detectors are sampled, the samples are put in their respective queues shifting all existing samples one place and causing one sample to be shifted out of each register to be used in a subsequent summing process. The samples that are shifted out of the registers are summed with the prior samples as shown in box 403, and a total of twenty samples from each of the detectors is summed. The designations for the summed samples are SP, SQ1 and SQ2 for the power, ringing and busy/reorder tone samples, respectively.

When twenty samples have been taken (box 404) the ringing and busy/reorder tone samples are normalized as shown in box 405. The normalization process is accomplished by dividing the summation term SQ1 of the ringing tone samples and the summation term SQ2 of the busy/reorder tone samples by the summation term SP of the total power samples. The normalization process forms the new terms called "normalized samples" which are designated NQ1 and NQ2. The normalization process is performed to ascertain the energy on the line, when measured at the designated pitch rate, expressed as a ratio to the total power on the line. Thus, it would be expected that when a legitimate tone is present on the line, most energy would be found in the pitch rate frequency spectrum of that tone. In other words, the normalized terms NQ1 and NQ2 would be larger for those samples taken of legitimate audible ringing and busy/reorder tones than when extraneous noise or other tones are detected.

The normalized ringing and busy/reorder samples (NQ1 and NQ2) and the summation of the total power term SP are stored in three corresponding buffer queues (designated RINGING BUFFER, BUSY BUFFER, and POWER BUFFER) in the memory of processor 100 as shown in box 406. The bulk of the rest of the operation of the processor concerns analyzing in parallel the data stored in these three buffer queues.

Before continuing with a description of the overall operation of the system, a brief description of a typical RINGING BUFFER queue will be given, and the reader will appreciate that the POWER BUFFER and BUSY BUFFER queues are similar.

The RINGING BUFFER queue comprises a plurality of memory cells in the memory of processor 100. Each cell contains an entry representing the normalized ringing sample as calculated above. Also, certain of the entries are designated by pointers to indicate the oldest and newest entries, the beginning and end of identified ringing tone intervals, and the starting of a new batch of data to be processed.

Figure 3:
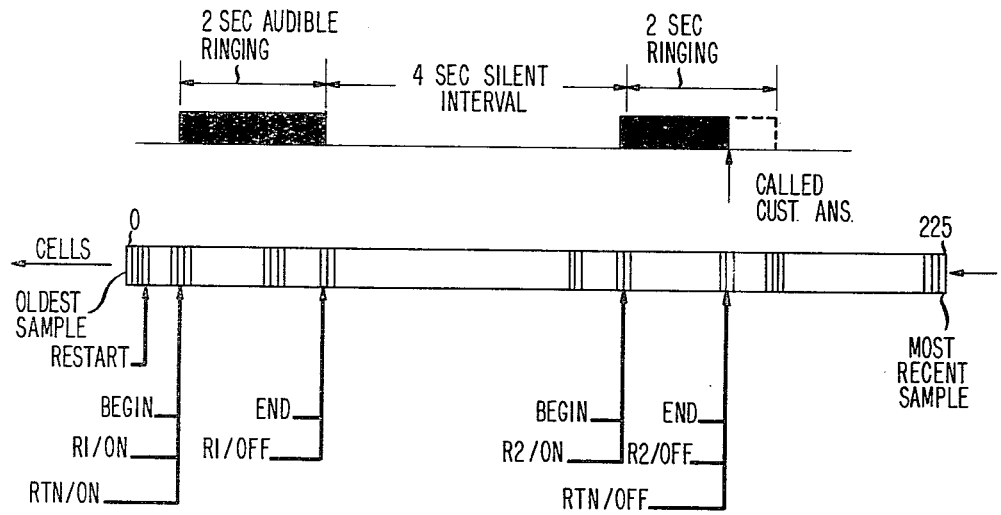
FIG. 3 is a graphical representation of a typical queue used in processing the signals detected by the service-observing arrangement.

The RINGING BUFFER queue can be thought of as a shift register as illustrated in FIG. 3 where the rightmost cell contains the most recent sample and the leftmost cell contains the oldest sample. From the system's operational standpoint, the leftmost sample can be considered the current sample with all cells to the right being future samples so that the processor can look into the future to ascertain the sequence of tones and decide whether or not sufficient samples have been taken to ascertain the cadence of the signal at the time the current sample is being processed. Thus, the outputs are not reported in real time, but are delayed by the length of the buffer queues.

Each cell contains a normalized ringing sample as described above. Since the normalized sample was calculated from twenty line samples at a 500 Hz scanning rate, each cell can be thought of as containing information observed on a line for 1/25th of a second.

The ringing signal comprises nominally two-second audible tones separated by four-second silent intervals. For the purpose of this disclosure it will be assumed that with an uninterrupted ringing signal the audible portion of the signal can fall within the range 1.4 seconds to 2.6 seconds and the silent portion between 2.8 seconds and 5.2 seconds. Consequently, the RINGING BUFFER queue can be 225 cells long for storing data representing a nine-second interval which would accommodate two full ringing bursts (one of which may be long) and a long silent interval.

The buffer queues are loaded in real time, but the processor must wait, nevertheless, for a successive number of entries before an identification of the tone can be made. To keep track of what data has been processed, a pointer called RESTART is used. With respect to FIG. 3, the samples to the left of the RESTART pointer have been processed while those to the right of the pointer, including the sample addressed by the pointer, have not.

Each time a new sample is added to the queue, all samples are shifted one cell to the left, and the RESTART pointer is moved so that it remains pointing to the same sample. When the RESTART pointer points to cell zero, the processing of data in the queue begins and this is initiated by calling the TONE SEARCH subroutine which is shown in FIGS. 8-11. The subroutine TONE SEARCH will process some, or all, of the data and will reposition the RESTART pointer, accordingly.

Other pointers used to define entries in the RINGING BUFFER queue are shown in FIG. 3. These pointers include R1/ON and R1/OFF, R2/ON and R2/OFF, etc. These pointers are set during the TONE SEARCH and RING EVAL subroutines and will be described below.

As new samples are added, all pointers are shifted to keep them aligned with the same sample. This is accomplished by box 407 in FIG. 4 for all of the buffer queues.

After the pointers have been shifted, the RESTART pointer is tested as set forth in box 408 to see if it points to cell zero. If it does not point to cell zero, it is shifted as shown in boxes 409-410, and more data is collected. When the RESTART pointer once again points to cell zero, the TONE SEARCH subroutine shown in FIGS. 8-11 is called by the processor executing box 411.

Up to this point in the sequence of operations, each entry in the power buffer, ringing buffer, and busy buffer queues contains the result of 20 samples having been summed. Moreover, the ringing and busy buffer queue entries have been normalized relative to the power buffer queue entries. The buffer queues are full as indicated by the RESTART pointer pointing to cell 0. Subroutine TONE SEARCH is now called.

The TONE SEARCH subroutine is depicted in FIGS. 8-11 and sets the ringing and busy pointers to locations in the respective buffer queues where samples representing these tones are located. For example, with respect to FIG. 3, pointer R1/ON points to a cell where the beginning of the first ringing interval was detected, while R1/OFF points to the cell representing the end of the first ringing interval. R2/ON and R2/OFF do the same for the second ringing interval if one has been detected. Four pointers designated B1/ON, B1/OFF, B2/ON and B2/OFF do the same for the BUSY BUFFER which has not been shown to simplify the drawing. If no tones were found as a result of the TONE SEARCH subroutine being executed, the ringing and busy pointers will be set to infinity, and the RESTART pointer is moved to the end of the queue so that another batch of data can be collected and processed. At the end of the TONE SEARCH subroutine a "return" is made to the MAIN control program. A more detailed description of the TONE SEARCH subroutine will be given below with respect to FIGS. 8-11.

Returning now to the description of the MAIN program and FIG. 5, a test is made of the R1/ON and B1/ON pointers to see if they have been set by TONE SEARCH to point to a cell within the buffer. This operation is shown in decision box 500. If either or both pointers have been set, the processor determines, by executing box 501, which one has been set first, and the appropriate RING EVAL or BUSY EVAL subroutine is called as shown in boxes 502 and 503.

The RING EVAL subroutine evaluates the cadence of the tones as further verification of an audible ringing signal, while in the case of the BUSY EVAL subroutine, the cadence is checked to ascertain if the tone is a busy tone or reorder signal.

During execution of the RING EVAL subroutine, pointers RTN/ON and RTN/OFF will be set to indicate certain cells in the RINGING BUFFER queue which represent the beginning and end of an audible ringing signal. Similar pointers are set for the BUSY BUFFER queue. As new samples of data are added to the queues, these pointers are shifted to remain pointing to the same sample. When one of these pointers is set at cell zero, an indication of the tone that has been ascertained is reported. This sequence of events is depicted by boxes 504-509 and 600-605. Following the outputting of tone-on and tone-off signals, the summation of the power, ringing, and busy tone indications and the number of the sample being processed are reset to zero as shown in box 606. The program can now be reexecuted to gather new data samples for analyzation.

"TONE SEARCH" SUBROUTINE SEQUENCE

As mentioned above, when the buffer queues are full as indicated by the RESTART pointer pointing to cell zero (boxes 410 and 411), the MAIN program calls the TONE SEARCH subroutine which is shown in FIGS. 8-11.

The TONE SEARCH subroutine searches the data collected in the three buffer queues designated RINGING BUFFER, BUSY BUFFER and POWER BUFFER for the presence of possible "tone-on" intervals. The data is searched to ascertain if the power is within acceptable limits and to ascertain if the normalized ringing or busy/reorder samples exceed a predetermined threshold. If certain samples exceed these thresholds the number of samples is measured to ascertain if the possible "tone-on" interval fits within predesignated minimum and maximum length specifications. Also, the ratio of maximum to minimum power over a "tone-on" interval will be measured to see if it falls within designated criteria.

The TONE SEARCH subroutine will generally search the collected data until all data is screened or until two valid "tone-on" intervals have been found.

The TONE SEARCH subroutine controls several pointers in processing the data stored in the queues. Initially it sets a pointer designated "i" to zero as shown in box 800. The "i" pointer marks the cell to be processed by the subroutine, and initially the oldest or leftmost cell as shown in FIG. 3 is processed. This pointer will be incremented by the execution of the subroutine after each cell is examined until all current data in the buffer has been processed, or until two ringing tone or two busy tone intervals have been detected.

The execution of box 801 tests to see if all cells have been processed or if two tone intervals have been detected, and if any one of these conditions have been met the RESTART pointer is reset and the subroutine is exited. If none of these conditions is met, all cells in the buffer will be examined and this begins by taking the summation of power sample in cell "i" (SPi) and testing to see if it is within the acceptable power limits as shown in box 803. This action ascertains whether the sample "i" being processed has sufficient power to be considered a possible "tone-on" condition. If it is not within the minimum and maximum thresholds, the pointer "i" is moved to the next sample. The minimum and maximum power limits are a matter of designer's choice depending on the requirements of the system.

One might consider the range −4 dBm0 to −46 dBm0 acceptable.

Figure 10:
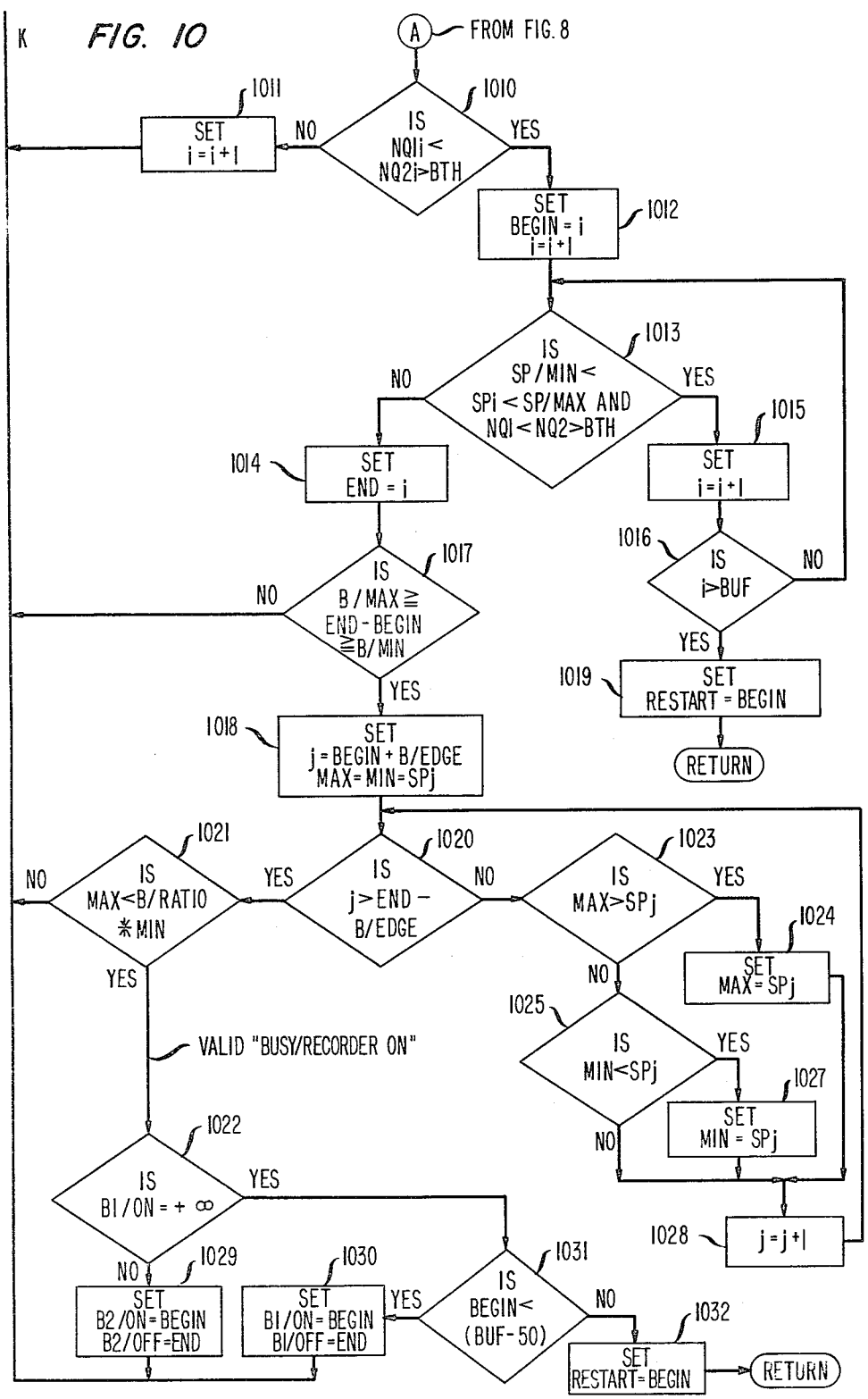

Let it be assumed that the sample is within the acceptable power range, and the system now executes box 805 to ascertain if the sample is an audible ringing tone candidate. This is accomplished by ascertaining if the normalized ringing sample NQ1i is greater than the normalized busy/reorder tone sample NQ2i and also greater than the ringing tone threshold designated by a constant RTH stored in memory. If the sample does not meet this test, the system executes the "no" branch of box 805 to test if the sample in cell "i" is a possible busy tone candidate as shown in FIG. 10. If the sample is neither a ringing tone candidate or a busy/reorder tone candidate the pointer "i" is incremented to the next buffer cell sample as shown in box 1011 and the process is repeated on the next sample.

Let it be assumed that the sample under consideration is a possible ringing "tone-on" candidate (i.e. NQ1i is greater than NQ2i and RTH). With this assumption, boxes 806–814 and 900–910 describe the sequence of operations for analyzing additional buffer queue samples in anticipation of finding a series of cells meeting the above criteria so that when viewed together the cells define a legitimate ringing "tone-on" interval. Had the busy tone candidate criteria been met, boxes 1010–1032 would be executed. These boxes describe the sequence of events that are substantially the same as the functions performed by executing boxes 806–814 and 900–908 except that different pointers will be set to define possible busy/reorder "tone-on" candidates.

Once the sample being processed is identified as a possible ringing tone candidate, its cell is marked by a pointer BEGIN (box 806), and the pointer "i" is incremented (box 808) in preparation for the analysis of the next cell. The processor, under control of boxes 807–809, will continue to search the samples in the buffer queues to see if they also meet the above criteria, namely the sample is within the acceptable power limits and falls between the normalized busy tone and ringing tone thresholds.

If each sample meets this criteria, pointer "i" is incremented for examination of the next sample. Boxes 809 and 810 prevent the investigation of the samples from going beyond the most recent entries in the queues. If this does occur, the RESTART pointer is set to the same sample as the BEGIN pointer, and the TONE SEARCH subroutine will only process new data when the buffer queues have been filled again.

If it is assumed that after several cells have been successfully tested, at least one of the conditions in box 807 fails indicating the possible end of a "tone-on" interval, then pointer END will be set to the cell being examined as shown in box 811. The processor then executes box 812 to see if the "tone-on" candidate falls within the acceptable length tolerances defined by constants R/MAX and R/MIN to indicate it is a "ring-on" condition.

In the example being described, the ringing signal comprises consecutive two-second ringing burst intervals separated by four-second silent intervals. It will be realized, however, that a connection may be established or terminated during a ringing burst wherein only a partial "ring-on" interval is detected. In order to allow for observation of a partial "ring-on" interval as well as a full "ring-on" interval, the minimum and maximum intervals for the ringing burst period have been selected in the illustrative example as 0.4 seconds and 2.6 seconds, respectively. However, it will be obvious to those skilled in the art that other intervals can be chosen. If the "tone-on" interval is not within these limits, it is not considered a possible "ring-on" condition and a new search is made. On the other hand, if the "tone-on" interval is within the specified limits, the processor will perform the power ratio functions described in boxes 813, 814 and 905 on the "tone-on" candidate under consideration.

During this process, the maximum and minimum power is ascertained over a portion of the "tone-on" interval. A few samples at the beginning and end of the interval are excluded since some ringing tone signals contain transients at the leading and trailing edges which peak above the maximum power. The number of samples to be ignored is determined by a constant designated RING/EDGE, and the quantity of samples defined by RING/EDGE is deleted from the beginning and end (boxes 813, 814) of the samples in the cells between the pointers BEGIN and END, each remaining cell is examined (boxes 900, 901) to ascertain what the maximum and minimum SP power is. The pointer "j" is established at this time to keep track of the cells being examined. When all cells between BEGIN plus RING/EDGE and END minus RING/EDGE have been tested, a ratio is formed of the maximum power to the minimum power samples. This ratio is compared to a constant designated RING/RATIO as shown in box 905. In the illustrative example, the ratio of maximum to minimum SP power has been selected as two and, if the sample data meets this criteria, it indicates that the "tone-on" interval is a valid "ring-on" interval. Boxes 906–910 will be executed now to set the pointers R1/ON and R1/OFF to mark the beginning and end of the "ring-on" location in the RINGING BUFFER queue. If a "ring-on" interval had been detected previously, the beginning and end of this "tone-on" interval would be marked with the pointers R2/ON and R2/OFF indicating it is the second interval that has been detected.

These pointers have been shown in FIG. 3 illustrating how the "ring-on" bursts are delimited in the RINGING BUFFER queue. Had the "tone-on" interval been determined to be a busy/reorder tone then the appropriate cells in the BUSY queue would be marked to delimit the "busy/reorder-on" samples.

"RING EVAL" SUBROUTINE SEQUENCE

Figure 12:
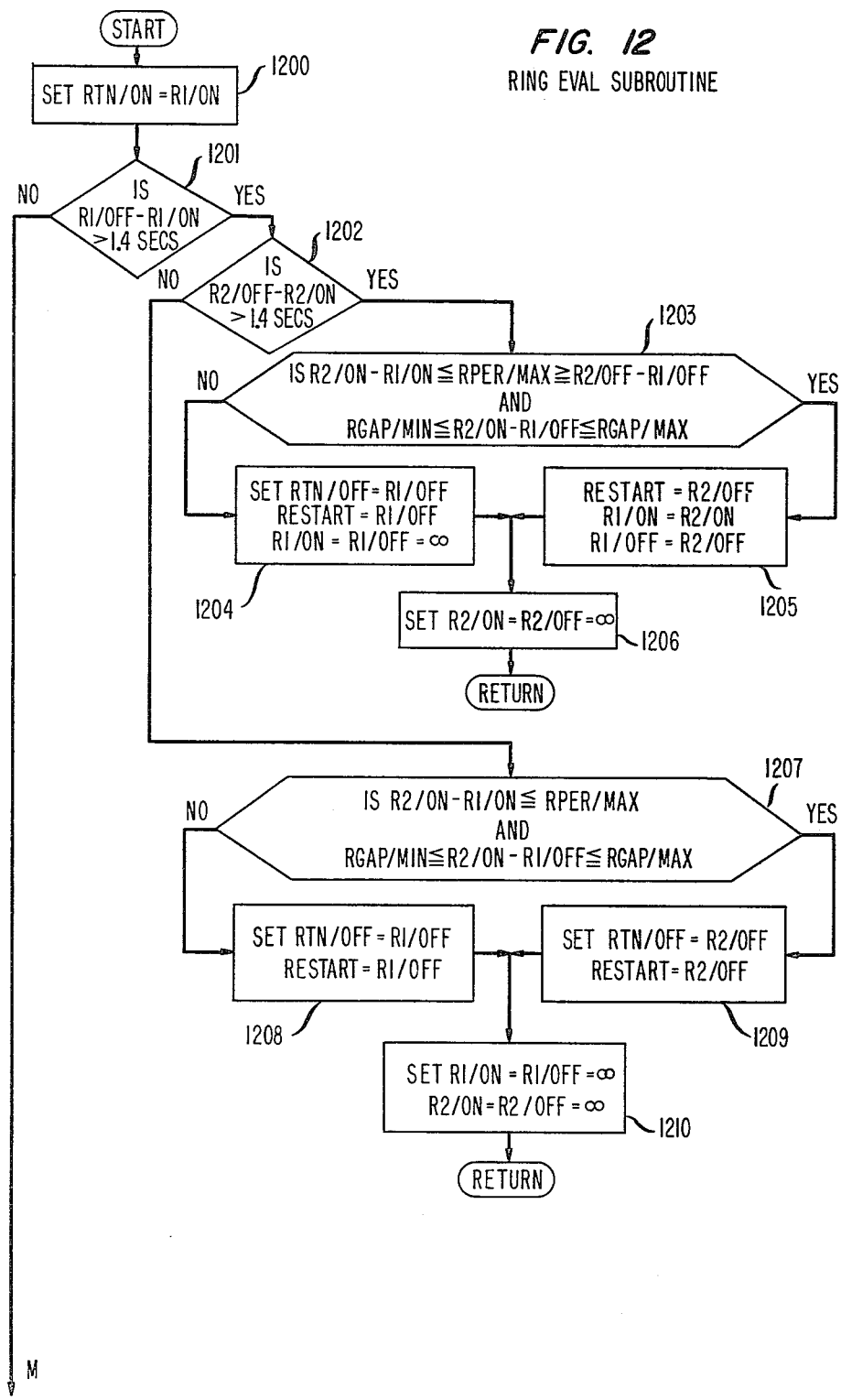
FIGS. 12 and 13, when arranged according to FIG. 14, show a flow diagram for the subroutine RING EVAL which describes the processor operation within the service-observing arrangement wherein the cadence of audible ringing signals is ascertained.
Figure 13:
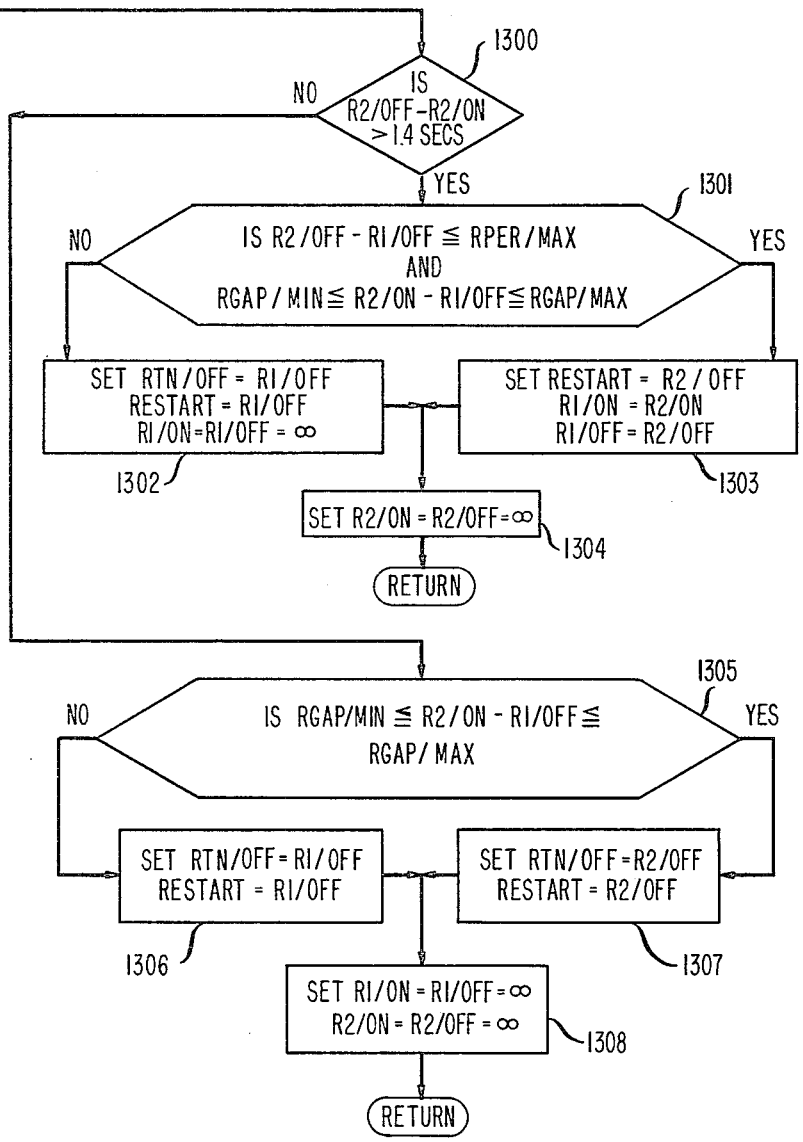
Figure 14:
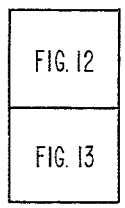

As mentioned above, when the TONE SEARCH subroutine is executed and the first valid ringing or busy/reorder tone interval is found, the RING EVAL or BUSY EVAL subroutine will be called by the MAIN control program in executing boxes 501–503. These EVAL subroutines are primarily concerned with the cadence of the detected signals. To illustrate, the RING EVAL subroutine flow diagram is shown in FIGS. 12–14, and the operation of the system will now be described with respect to this flow diagram.

The processor first sets the pointer designated RTN/ON, this is the ringing "tone-on" pointer and will be set at the beginning of the first "ring-on" interval as shown in box 1200. The processor then checks the length of the "ring-on" ringing interval to ascertain if it is a partial or short ring. The short ring is defined herein as a "ring-on" interval less than or equal to 1.4 seconds and greater than or equal to 0.4 seconds. This occurs when a line is connected to or disconnected from a ringing source during a ringing burst interval. Once the first "ring-on" interval is checked, the second "ring-on" interval is checked by executing the decision box 1202 or 1300.

Decision boxes 1203, 1207, 1301 and 1305 are executed to ascertain the cadence of the signal which can fall into any one of the six cases shown in FIG. 2. In executing the function described in these boxes, the processor checks the intertone gap and timing between the leading and/or trailing edges of successive intervals.

More specifically, if it is assumed that two "ring-on" intervals exceeding the minimum have been detected, the "yes" branches of boxes 1201 and 1202 will be executed and box 1203 will be executed to ascertain if a "two-second-on, four-second off, two-second-on" ringing cycle has been detected. This is the case A sample shown in FIG. 2.

In executing box 1203 the processor compares the time interval between the leading edges of the two "ring-on" periods (R2/ON) minus R1/ON) and the trailing edges of the "ring-on" periods (R2/OFF minus R1/OFF) to a constant designated RPER/MAX. The RPER/MAX constant has been selected to equal 6.6 seconds in this illustrative embodiment.

The processor also compares the interval between the first and second "ring-on" periods with ringing gap constants designated RGAP/MIN and RGAP/MAX. These constants have been selected as 2.8 seconds and 5.2 seconds, respectively, in this embodiment, but other constants can be used within the spirit and scope of the invention.

If these tests are successful indicating a valid ringing interval that may continue beyond the data searched, the RESTART pointer is reset to the cell designated R2/OFF and both pointers R1/ON and R1/OFF are moved to the cells priorly designated by the pointers R2/ON and R2/OFF. The latter pointers are reset to infinity.

These operations, described in boxes 1205 and 1206, have the effect of designating the second "ring-on" interval as the first interval so that the TONE SEARCH subroutine need only look for one additional "tone-on" period, should the ringing signal continue to be present on the line. In other words when processor 100 has successfully ascertained a sequence of two "tone-on" intervals via the RING EVAL or BUSY EVAL subroutines, each succeeding "tone-on" interval will be ascertained, one-at-a-time, by the TONE SEARCH subroutine.

If one of the tests in box 1203 fails indicating that the ringing signal has ceased, the "no" branch of that box is executed and pointer RTN/OFF is set to the cell designated by the pointer R1/OFF. This will cause the MAIN control program to report the end of the signal as depicted in boxes 506 and 507 in FIG. 5.

If either or both of the "ring-on" intervals is less than 1.4 seconds, box 1207, 1301 or 1305 will be executed. For example, let it be assumed that the call had been answered during the second "ring-on" interval after a full "ring-on" interval has been detected. This is designated as case C in FIG. 2, and the pointers will be set to the cells in the RINGING BUFFER as shown in FIG. 3.

The processor will execute boxes 1201 and 1202 and since the second "ring-on" interval has been detected as short, the "no" branch of box 1202 is executed causing the processor to follow the sequence of events in box 1207. In this case the interval between the trailing edges of the two "ring-on" periods is not checked.

If the tests outlined in box 1207 are both successful then the processor determines that the second "ring-on" interval is the end of the ringing signal and pointer RTN/OFF is set to the cell at the end of the second "ring-on" period causing this result to be outputted. If one of the tests in box 1207 fails the processor assumes that the first and second "ring-on" intervals are actually part of separate ringing signals and sets the RESTART and RTN/OFF pointers to the cell designating the end of the first "ring-on" interval and begins collecting samples for the new ringing signal.

In summary, the case A as shown in FIG. 2 is screened by box 1203 and case B is screened by box 1301.

Case C (described above) and case E are ascertained by executing decision box 1207 while box 1305 screens the cases D and F as shown in FIG. 2. If a leading or trailing edge is suspected of being clipped, that edge is not considered in the cadence check. Thus, in box 1305 where one or both "ring-on" intervals have been analyzed as short, only the gap between the intervals is checked during the cadence screening process.

In the cases E and F where only one "ring-on" interval has been detected, the cadence test will fail and the "no" branch of boxes 1207 or 1305 will be executed. The ringing tone off pointer (RTN/OFF) will be set pointing to the end of the first detected ringing interval. This designates the time in which the main program will cause the processor to output the ringing tone off report.

In executing boxes 1203 or 1301, if the processor ascertains that the second "ring-on" interval is a full two seconds long, one of the "yes" branches of these boxes is executed to perform the functions in boxes 1205 and 1206 or 1303 and 1304, respectively. Under these conditions, the ringing sequence may continue. The processor therefore moves the pointers R1/ON and R1/OFF so that the second ringing signal becomes the first in the buffer queue, and the R2/ON and R2/OFF pointers are set to infinity. This causes the TONE SEARCH subroutine to search for just one ringing-on interval, the next time that the subroutine is executed.

If two ring-on intervals are detected, but the time between the ring-on intervals does not fall within the minimum and maximum values for the ringing gap, the "no" branch of box 1203, 1207, 1301 or 1305 is executed and the second "ring-on" interval is assumed to be the start of a new ringing signal.

"BUSY EVAL" SUBROUTINE SEQUENCE

Figure 15:
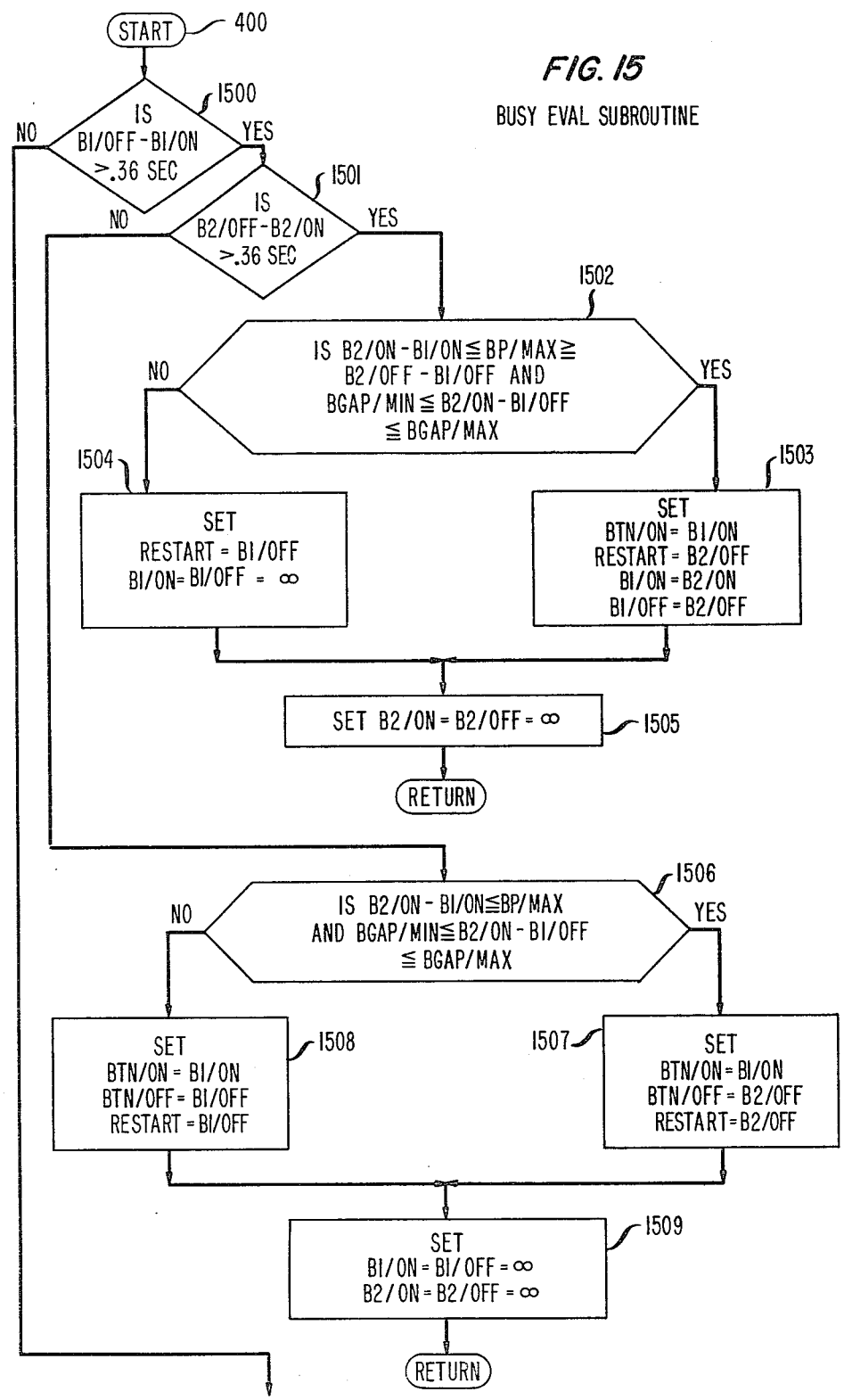
FIGS. 15 and 16, when arranged according to FIG. 17, show a flow diagram for the subroutine BUSY EVAL which describes the processor operation for detecting the cadence of busy and reorder signals.
Figure 16:
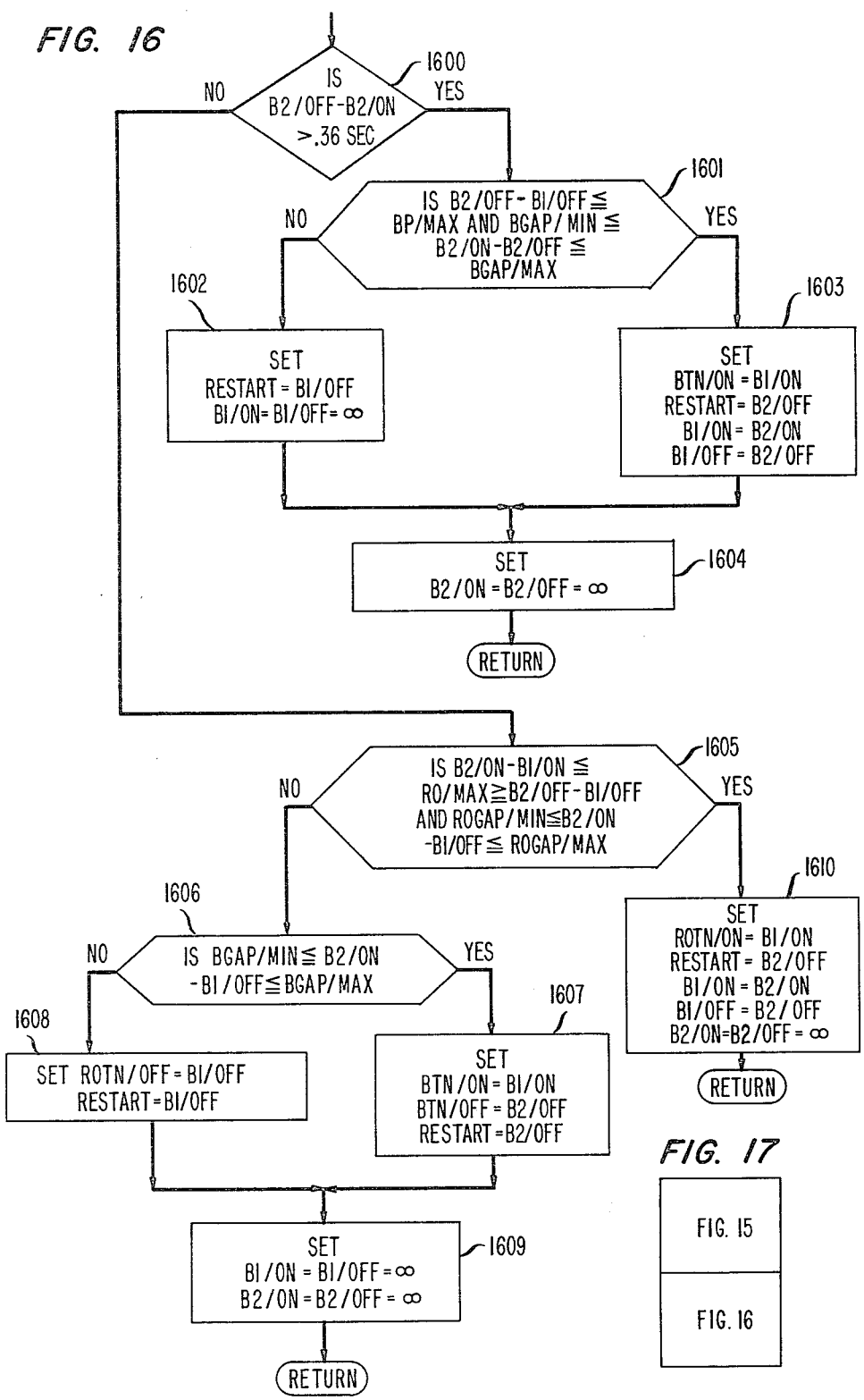
Figure 17:
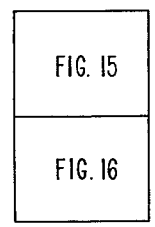

The BUSY EVAL subroutine is called by the MAIN control program sequence when box 503 (FIG. 5) is executed. The BUSY EVAL subroutine is depicted in FIGS. 15 and 16 (arranged according to FIG. 17) and when executed by processor 100, the subroutine performs the cadence checking for busy and reorder signals as the RING EVAL subroutine does for audible ringing signals.

The BUSY EVAL subroutine must determine if the "tone-on" intervals detected are either busy or reorder since these signals use the same source and only differ by cadence in the illustrative embodiment. As mentioned above, in the example being described the busy signal is a combination of tones interrupted 60 times per minute while the reorder signal is the same combination of tones interrupted 120 times per minute. Consequently, if only one "tone-on" interval is detected the signal may not be classified in some cases.

For example, if the "tone-on" interval is long enough to be a legitimate busy tone, the signal can be properly identified. If however, a short "tone-on" is detected, the system may not be able to distinguish between a busy tone that was cut short and a reorder "tone-on" interval which is usually half as long as the normal busy "tone-on" interval.

The BUSY EVAL subroutine will not be described in detail herein since it functions for determining the cadence of busy/reorder tones and is similar to the functions described above with respect to the RING EVAL subroutine in the determination of the cadence of ringing signals. In brief, box 1502 recognizes a busy signal when two normal "busy-on" intervals have been detected while box 1506 recognizes a busy signal from one normal "busy-on" interval followed by a short "busy-on" tone. Box 1606 when executed, determines that a busy signal is present on the basis of two short "busy-on" intervals that are separated by the appropriate time interval, while box 1601 recognizes a busy from an initial short "tone-on" interval followed by a normal "tone on" interval.

When box 1606 is executed the processor ascertains that this is a busy signal by virtue of the length of the gap between "busy-on" intervals since both "busy on" intervals are short. Similarly box 1605 is executed to ascertain that the signal is a reorder signal due to the two short "tone-on" intervals and the short silent gap between them.

In summary, a method and arrangement has been described for detecting signals having preassigned pitch rates wherein a telephone line is monitored and all signals at the pitch rate are first filtered out of the original signal. The signal remaining after the filtering process is modulated to generate the sum and difference terms of the individual components of the remaining signal. Energy is measured in the modulated signal at the pitch rate and this energy is compared to the total energy of the modulated signal. If the energy at the preassigned pitch rate is high indicating the possibility of a "tone-on" condition, the cadence of the "tone-on" and silent intervals is ascertained to determine if it fits into the pattern of known signals such as audible ringing, busy, reorder, and the like.

It is to be understood that the above-described arrangements are merely illustrative of the application of the principles of the invention. Numerous other arrangements may be devised by those skilled in the art without departing from the spirit and scope of the invention. For example, signals of different pitch rates, frequencies and cadence than those described above may be detected and different threshold values than those illustrated may be used.

APPENDIX

Following is a summary and explanation of certain designations that have been used in the specification and drawing:

| | |
|---|---|
| BUF | Defines length of buffer queues. Illustratively equal to 9 seconds which is long enough to store samples of two valid "ring-on" intervals. |
| P, Q1, Q2 | Outputs from detectors 103, 104 and 105 that represent, respectively, the total energy on the line and the energy at the designated pitch rates for ringing and busy/reorder. |
| SP, SQ1, SQ2 | A summation of samples of P, Q1, and Q2, respectively. |

-continued

| | |
|---|---|
| NQ1, NQ2 | Normalized ringing and busy/reorder samples derived by dividing summation terms at the pitch rate by the summation of power. |
| SP/MIN<br>SP/MAX | The minimum and maximum acceptable tone power thresholds (illustratively −4dBm0 and −46dBm0, respectively). |
| RESTART | Pointer to the buffer queue that delimits the samples in cells that have been processed from those samples that have not. |
| BEGIN<br>END | Pointers to the buffer queue marking the beginning and end of a "tone-on" interval. |
| MIN<br>MAX | Minimum and maximum power values found in the buffer queue cells. |
| ROTN/ON<br>ROTN/OFF | Pointers to the buffer queue marking the beginning and end of a detected reorder signal. |
| R1/ON<br>R1/OFF<br>R2/ON<br>R2/OFF | Pointers to the buffer queue marking the beginning and end of the first and second "ring-on" intervals, respectively. |
| RTN/ON<br>RTN/OFF | Pointers to the buffer queue marking the beginning and end of a detected ringing signal. |
| R/MIN<br>R/MAX | The minimum and maximum "ring-on" interval (illustratively 0.4 sec. and 2.6 sec., respectively). |
| R/EDGE | The number of samples to be deleted from "ring-on" samples to eliminate leading and trailing edge transients (illustratively 3 cells). |
| RGAP/MIN<br>RGAP/MAX | The minimum and maximum intervals between successive "ring-on" intervals (illustratively 2.8 sec. and 5.2 sec., respectively). |
| RPER/MAX | The maximum ringing period including one audible and one silent interval (illustratively 6.6 sec.) |
| R/RATIO | The maximum acceptable ratio of maximum power to minimum power during "ring-on" interval (illustrative value = 2) |
| RTH | The minimum threshold a normalized sample must exceed to be considered a "ring-on" candidate. |
| B1/ON<br>B1/OFF<br>B2/ON<br>B2/OFF | Pointers to the buffer queue marking beginning and end of the first and second "busy-on" intervals, respectively. |
| BTN/ON<br>BTN/OFF | Pointers to the buffer queue marking the beginning and end of a detected busy signal. |
| B/MIN<br>B/MAX | The minimum and maximum "busy-on" interval (illustratively 0.2 sec. and 0.68 sec., respectively) |
| B/EDGE | The number of samples to be deleted from "busy-on" samples to eliminate leading and trailing edge transients (illustratively 1 cell). |
| BGAP/MIN<br>BGAP/MAX | Minimum and maximum intervals between successive "busy-on" intervals (illustratively 0.32 sec. and 0.72 sec., respectively). |
| B/RATIO | Maximum acceptable ratio of maximum power to minimum power during "busy-on" interval (illustrative value = 2). |
| BTH | The minimum threshold a normalized sample must exceed to be considered a "busy-on" candidate. |
| BPER/MAX | The maximum busy period (illustratively 1.12 sec.) |
| ROPER/MAX | The maximum reorder period (illustratively 0.56 sec.) |
| ROGAP/MAX<br>ROGAP/MIN | The maximum and minimum interval between two successive "busy-on" intervals in a reorder tone (illustratively 0.36 sec. and 0.24 sec., respectively). |

What is claimed is:

1. In a communication system a method for classifying each of a plurality of repetitive signals on a communication line wherein one of the signals comprises at least two frequencies whose difference falls within a predetermined bandwidth and wherein another of said signals comprises a frequency outside said bandwidth modulated by a frequency within said bandwidth, the method comprising the steps of removing said bandwidth from a monitored one of said signals, modulating the remaining signal, comparing the energy of said modulated signal that falls within said bandwidth with the total energy of said remaining signal to form a resultant signal, and identifying the resultant signal.

2. The method of claim 1
wherein the step of modulating the remaining signal comprises the step of squaring said remaining signal.

3. The method of claim 1
wherein the step of comparing comprises the steps of
measuring the energy level of a portion of the modulated signal within said bandwidth, and
forming a ratio of the energy level measured within said bandwidth to the energy level of the modulated signal.

4. For use in a telecommunications system having a plurality of lines for calls between customer stations wherein signals are transmitted over said lines to indicate to the stations the status of calls thereon and wherein the signals representing a particular status comprise repetitive signals each including at least two frequencies which are combined to generate an audible signal at a pitch rate discarnible to a listener at a said station, an arrangement for automatically identifying said status signals comprising means for monitoring the signal present on a said line, means for removing from said monitored signal frequencies corresponding to said pitch rate, means for modulating the remaining signal, first means for ascertaining the energy level at the pitch rate in the modulated remaining signal, means for combining the ascertained energy level with the energy level of the modulated remaining signal to form a resultant signal representative of said combined energy levels, and second means for ascertaining the repetition rate of said resultant signal.

5. The invention defined in claim 4 wherein said removing means comprises a bandpass filter for providing low impedance to frequencies between approximately 300 Hz and 900 Hz.

6. The invention defined in claim 4 wherein said modulating means comprises means for combining the frequencies present in said remaining signal in a nonlinear manner.

7. The invention defined in claim 4 wherein said second ascertaining means comprises means for accumulating a plurality of said resultant signals during a predetermined time interval.

8. The invention defined in claim 4 wherein said first ascertaining means comprises means for providing a potential corresponding to a predesignated band of frequencies.

9. The invention defined in claim 8 wherein said combining means comprises means for dividing the potential provided by said first ascertaining means by a potential representing said remaining signal.

10. In a communication system a method for identifying each of a plurality of repetitive status signals on a communication line wherein one of said status signals comprises at least two frequencies outside a predetermined bandwidth whose difference falls within said bandwidth and wherein another of said status signals comprises a frequency outside said bandwidth modulated by a frequency within said bandwidth, the method comprising the steps of filtering from a monitored one of said status signals all signals within said bandwidth, modulating the remaining signal, p1 measuring the energy of that portion of said modulated signal within said bandwidth, forming a ratio signal by dividing the measured energy of any signal with said bandwidth by the energy of the modulated signal, and identifying the monitored signal by analyzing the repetition rate of said ratio signal.

11. The invention defined in claim 10 wherein the step of identifying the monitored signal comprises the step of measuring the duration of the ratio signal.

12. The invention defined in claim 10 wherein the step of identifying the monitored signal comprises the step of measuring the time interval between successive ratio signals.

* * * * *

UNITED STATES PATENT AND TRADEMARK OFFICE
CERTIFICATE OF CORRECTION

PATENT NO. : 4,384,175

DATED : September 8, 1981

INVENTOR(S) : David B. Brown

It is certified that error appears in the above-identified patent and that said Letters Patent is hereby corrected as shown below:

Column 1, line 17, "cells" should read --calls--; line 33, "recorder" should read --reorder--. Column 7, line 37, "respectively," should read --respectively.--. Column 13, line 19, "(R2/ON) minus" should read --(R2/ON minus--. Column 14, line 10, ""ring-on"" should read --"tone-on"--. Column 17, line 32, "discarnible" should read --discernible--. Column 18, line 32, after "signal," there should be a new paragraph.

Signed and Sealed this

Second Day of August 1983

[SEAL]

Attest:

Attesting Officer

GERALD J. MOSSINGHOFF

Commissioner of Patents and Trademarks